United States Patent
Mitchell et al.

(10) Patent No.: US 9,497,953 B2
(45) Date of Patent: Nov. 22, 2016

(54) SPRAYER

(71) Applicant: The Fountainhead Group, Inc., New York Mills, NY (US)

(72) Inventors: George A. Mitchell, Utica, NY (US); Mario J. Restive, Frankfort, NY (US)

(73) Assignee: THE FOUNTAINHEAD GROUP, INC., New York Mills, NY (US)

( * ) Notice: Subject to any disclaimer, the term of this patent is extended or adjusted under 35 U.S.C. 154(b) by 0 days.

(21) Appl. No.: 14/483,876

(22) Filed: Sep. 11, 2014

(65) Prior Publication Data

US 2015/0129682 A1    May 14, 2015

Related U.S. Application Data

(60) Provisional application No. 61/876,379, filed on Sep. 11, 2013.

(51) Int. Cl.
| | |
|---|---|
| *B05B 9/043* | (2006.01) |
| *B05B 9/04* | (2006.01) |
| *B05B 9/08* | (2006.01) |
| *B05B 11/00* | (2006.01) |
| *B05B 15/06* | (2006.01) |
| *A01M 7/00* | (2006.01) |
| *F16L 37/40* | (2006.01) |

(52) U.S. Cl.
CPC .......... *A01M 7/0046* (2013.01); *B05B 9/0426* (2013.01); *B05B 9/0861* (2013.01); *B05B 11/0005* (2013.01); *B05B 11/3042* (2013.01); *B05B 15/061* (2013.01); *F16L 37/40* (2013.01); *B05B 11/0008* (2013.01)

(58) Field of Classification Search
CPC ..... B05B 9/04; B05B 9/0403; B05B 9/0426; B05B 9/043; B05B 9/0811; B05B 9/085; B05B 9/0855; B05B 9/0861; B05B 9/0877; B05B 11/0005; B05B 11/0008; B05B 11/3042; F16L 37/40; A01M 7/0046
See application file for complete search history.

(56) References Cited

U.S. PATENT DOCUMENTS 4,930,664 A * 6/1990 Ellison .............................. 222/1
5,469,993 A * 11/1995 Hauf et al. .................. 222/383.3
(Continued)

FOREIGN PATENT DOCUMENTS

| EP | 1205253 | 5/2002 |
| WO | 9726210 | 7/1997 |

OTHER PUBLICATIONS

PCT Notification of Transmittal of the International Search Report and Written Opinion of the International Searching Authority, or the Declaration dated Mar. 3, 2015.

*Primary Examiner* — Darren W Gorman
(74) *Attorney, Agent, or Firm* — Bond Schoeneck & King, PLLC; George McGuire

(57) ABSTRACT

A lawn and garden sprayer system having a container and a spray wand fluidly connected to the container is provided. The spray wand includes a wand housing that has a slot formed in one side thereof that is configured to engage a lug formed on one side of the container for purposes of stowing the wand during shipping and when not in use. A communications card assembly is detachably connected between the container and spray wand during shipment and prior to its first use. The hose includes a coupler end that engaged a cap on the container and facilitates creation of a fluid circuit between the fluid contents in the container and the wand.

10 Claims, 14 Drawing Sheets

(56) References Cited

U.S. PATENT DOCUMENTS

| | | |
|---|---|---|
| 5,676,314 A * | 10/1997 | Brass et al. .................. 239/373 |
| 5,862,948 A * | 1/1999 | Duchon et al. ............... 222/133 |
| 6,170,706 B1 | 1/2001 | Havlovitz |
| 6,202,717 B1 * | 3/2001 | Markey et al. ................ 141/383 |
| 6,367,665 B1 * | 4/2002 | Barriac et al. ............. 222/383.3 |
| 2005/0189380 A1 | 9/2005 | Sweeton |
| 2006/0060613 A1 * | 3/2006 | Englhard et al. ............. 222/401 |
| 2007/0205230 A1 * | 9/2007 | Arcuri et al. ................. 222/530 |

* cited by examiner

SPRAYER

REFERENCE TO RELATED APPLICATION

The present application relates and claims priority to Applicant's U.S. Provisional Patent Application Ser. No. 61/876,379, filed Sep. 11, 2013, the entirety of which is hereby incorporated by reference.

BACKGROUND

1. Field of Invention

The present invention relates generally to lawn and garden sprayers.

2. Background of Art

Lawn or garden sprayers use pressure to apply liquid fertilizers, pesticides, or other chemicals. A recent development is to utilize a battery-powered electric motor in the sprayer wand to provide the spraying pressure, rather than hand pumping.

For present-day sprayers packaged at point of sale, the wand and its hose are stored separately from the sealed container and held in a separate "holster" carry device that is attached to the container, with the wand pointing up. Once the wand and hose are unpackaged and assembled for use, the holster may then be used for continued carry and storage of the wand. The holster uses tabs and knobs to reattach the wand, which is cumbersome for the user, and as a result does not hold the wand and hose as securely as originally packaged.

The hose is typically connected to the container by sliding the hose end plug onto the horizontally positioned spout on the container cap. In this position the spout mechanism is designed such that the container is sealed. To use the sprayer, the spout must be rotated from the horizontal to the vertical position. With the spout in the up position, the fluid circuit to the wand is opened. Simultaneously, a small open port in the cap under the spout is exposed which permits air to enter the container; without this air port the fluid would not flow. For storage, the spout can be repositioned horizontally, in order for the spout mechanism to seal the container.

For contemporary battery-powered wand sprayers, the batteries, electric motor, pump mechanism, and related electrical and fluid circuits are housed in the wand handle. A user-operated trigger functions to actuate the motor and to simultaneously allow fluid to flow to the pump. Fluid flow to the pump is controlled by a valve body that is separate from the motor housing. Having the valve body separate from the motor housing adds complexity to the design.

3. Objects and Advantages

It is a principal object and advantage of the present invention to provide a sprayer that enables improved ease of operation and increased functional efficiency.

Other objects and advantages of the present invention will in part appear hereinafter and in part be obvious.

SUMMARY OF THE INVENTION

In accordance with the foregoing objects and advantages, an embodiment of the present invention provides a lawn and garden sprayer system having a container and a spray wand fluidly connected to the container is provided. The spray wand includes a wand housing that has a slot formed in one side thereof that is configured to engage a lug formed on one side of the container for purposes of stowing the wand during shipping and when not in use. A communications card assembly is detachably connected between the container and spray wand during shipment and prior to its first use. The hose includes a coupler end that engaged a cap on the container and facilitates creation of a fluid circuit between the fluid contents in the container and the wand. In another embodiment of the invention a motor is housed in a wand handle and includes a fluid valve body integrated therein which is actuable between open and closed positions via a manually operable trigger mounted to the wand housing.

In one aspect, the present invention provides a sprayer assembly, comprising a container; a spray wand; a hose fluidly interconnecting the spray wand to said container; and a fluid circuit that comprises: a coupler attached to the hose and adapted for attachment to the container; a stem extending downwardly from the coupler along a longitudinal axis; air and fluid passageways extending from within the container through the coupler; a plunger extending along the longitudinal axis and movable between sealed and unsealed relation to the air and fluid passageways; and a spring extending along the longitudinal axis and positioned in biased relation to said plunger, whereby the spring is compressed when the coupler is attached to the container and biases the plunger out of sealing relationship with the air and fluid passageways.

In another aspect, the present invention provides a sprayer assembly, comprises: a container; a spray wand; a hose fluidly interconnecting the spray wand to the container; and a fluid circuit that comprises: a coupler attached to the hose and adapted for attachment to the container; a stem extending downwardly from the coupler along a longitudinal axis; an air passageway extending from within said container through the coupler; a fluid passageway extending from within the container through the coupler a plunger extending along the longitudinal axis and movable between sealed and unsealed relation to the one of air and fluid passageways; a dip tube holder extending along the longitudinal axis; a valve mounted within the container and movable between sealed and unsealed relation to the one of the air and fluid passageways to which the plunger is not relatively movable; and a spring extending along the longitudinal axis and positioned between the dip tube holder and the plunger, whereby the spring is compressed when the coupler is attached to the container and biases the plunger out of sealing relationship with the one of the air and fluid passageways and biases the dip tube holder which in turn moves the valve out of sealing relationship with the one of the air and fluid passageways.

In another aspect, the present invention provides a sprayer assembly, comprising: a container; a spray wand comprising a handle portion and a wand portion, the handle portion comprising a slot formed therein; a hose fluidly interconnecting the spray wand to the container; a lug formed on the container and to which the slot can engage and mount the spray wand to the container; and a communication card assembly comprising a card retaining surface and an assembly portion that engages the lug, the communication card assembly being positioned between the container and the spray wand.

In another aspect, the present invention provides a sprayer assembly, comprising a container for storing fluid therein; a spray wand comprising a handle portion and a wand portion; a motor contained within the handle portion; and a fluid circuit assembly, comprising a manually actuable trigger mounted to the spray wand; a fluid inlet that is in fluid communication with fluid contained within the container; a fluid outlet positioned in fluid communication with the wand portion; and a valve that is movable upon user actuation of the trigger from a first position that prevents fluid from flowing from the fluid inlet to the fluid outlet and a second position wherein fluid can flow from the fluid inlet to the fluid outlet.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
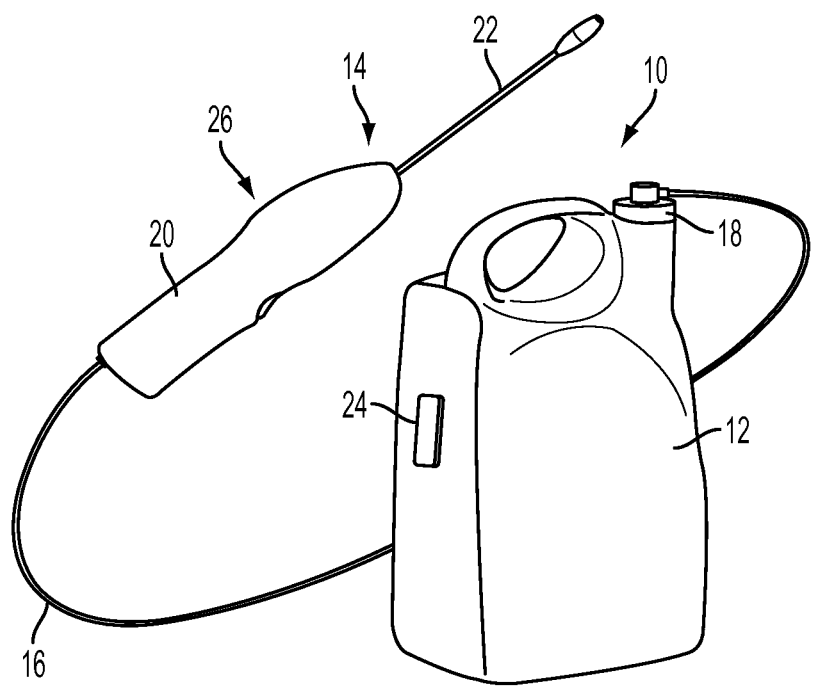
FIG. 1 is a perspective view of a sprayer assembly with the spray wand detached from the container in accordance with an aspect of the present invention.
Figure 2:
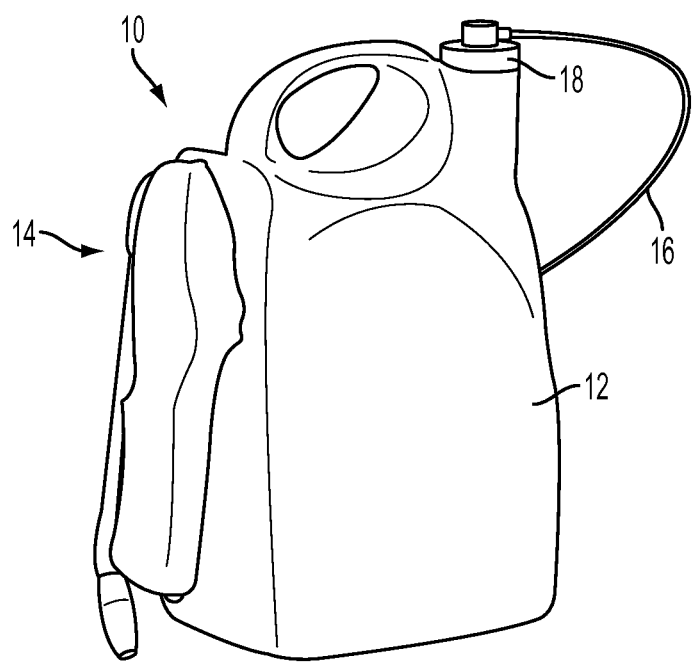
FIG. 2 is a perspective view of a sprayer assembly with the spray wand attached to the container in accordance with an aspect of the present invention.

Referring now to the drawings wherein like reference numerals refer to like parts throughout, there is seen in FIGS. 1 and 2 a sprayer system designated generally by reference numeral 10 essentially comprising container 12 and spray wand 14 fluidly connected to container 12 by flexible hose 16. More specifically, flexible hose 16 extends between wand 14 and a cap 18 positioned on top of container 12.

Spray wand 14 comprises a handle/wand housing 20 and wand portion 22 that is telescopically attached to handle 20 for sliding movement between stored (non-operational) and extended (operational) positions. A lug 24 is formed on the rear wall of container 12 and provides a mounting point for spray wand 20. Handle 20 includes a slot 26 formed therein that is sized and shaped to securely slidingly engage lug 24 from the top, thereby permitting spray wand 14 to be stored on container 12 with wand portion 22 facing downward during shipment/display and when not in use and stored away. Having the wand portion 22 pointing down prevents liquid from falling back into the wand when it is being stored.

Figure 3:
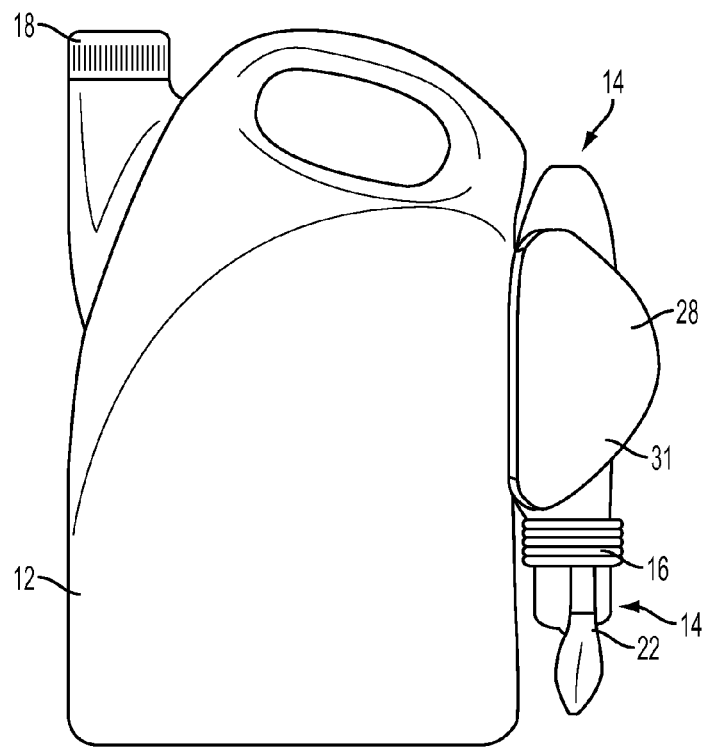
FIG. 3 is a front elevation view of the sprayer assembly in its shipped/unused condition.
Figure 4:
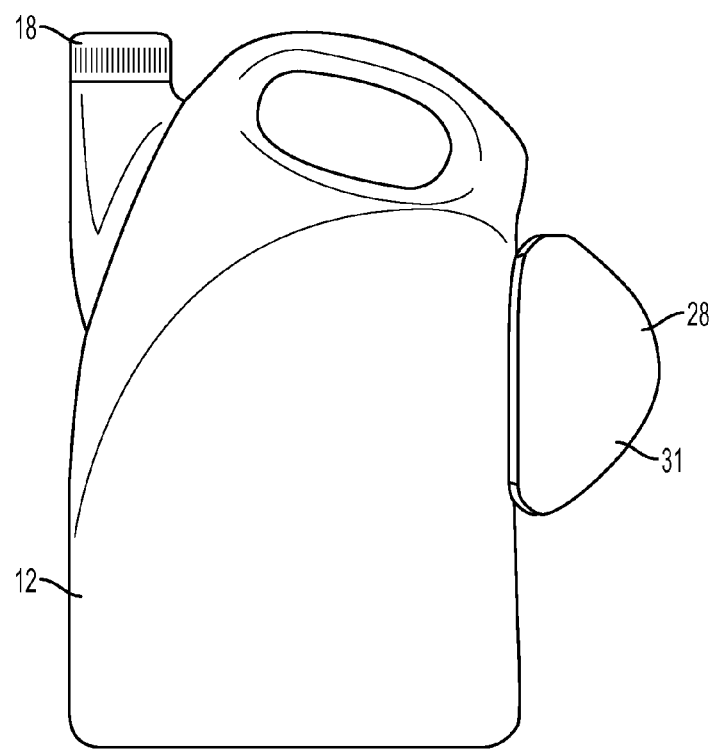
FIG. 4 is a front elevation view of a refill container in accordance with an aspect of the present invention.
Figure 5:
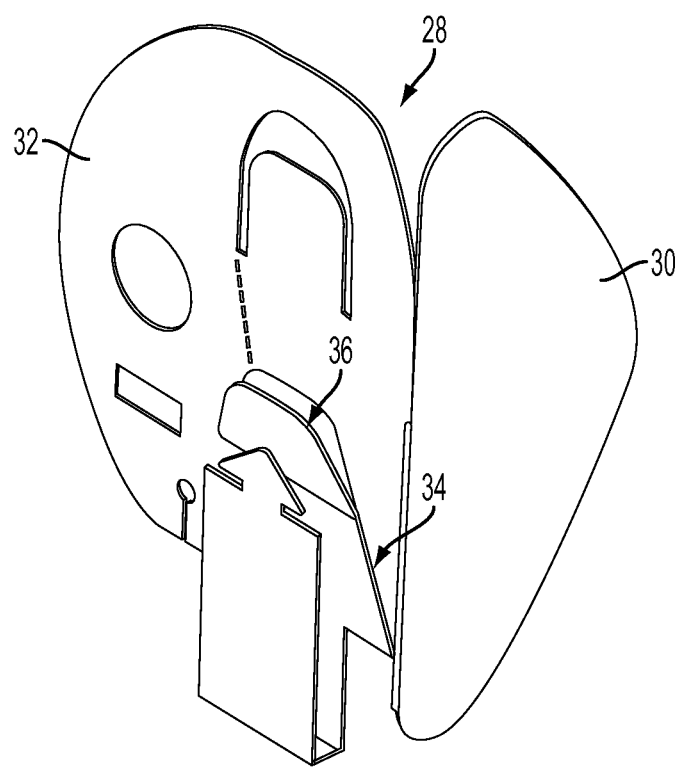
FIG. 5 is a perspective view of a communications card assembly in accordance with an aspect of the present invention.
Figure 6A:
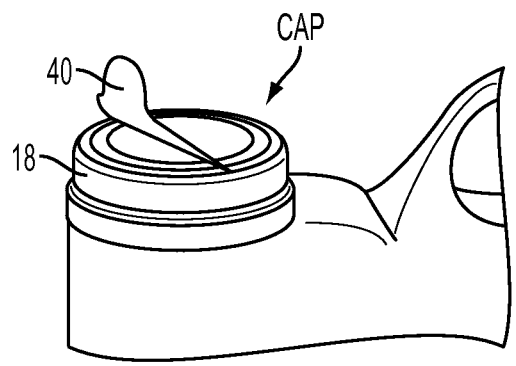
FIGS. 6A-6C are partial, sequential perceptive views illustrating connection of a hose to a container in accordance with an aspect of the present invention.
Figure 6B:
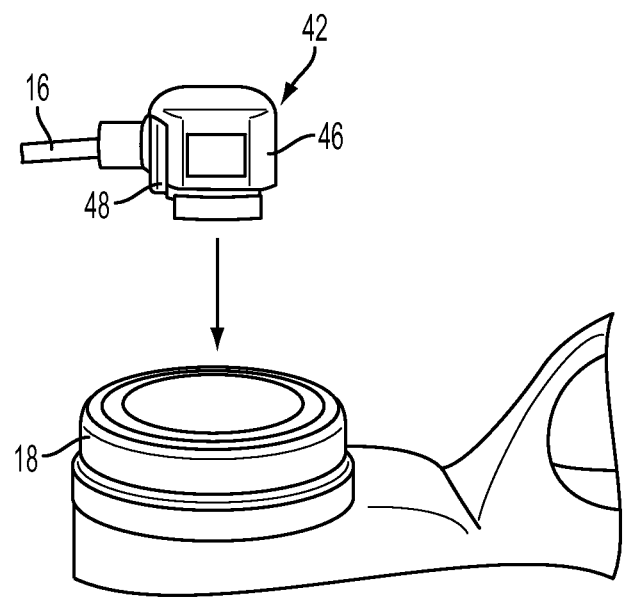
Figure 6C:
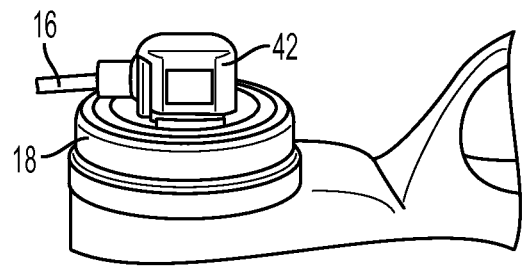
Figure 7A:
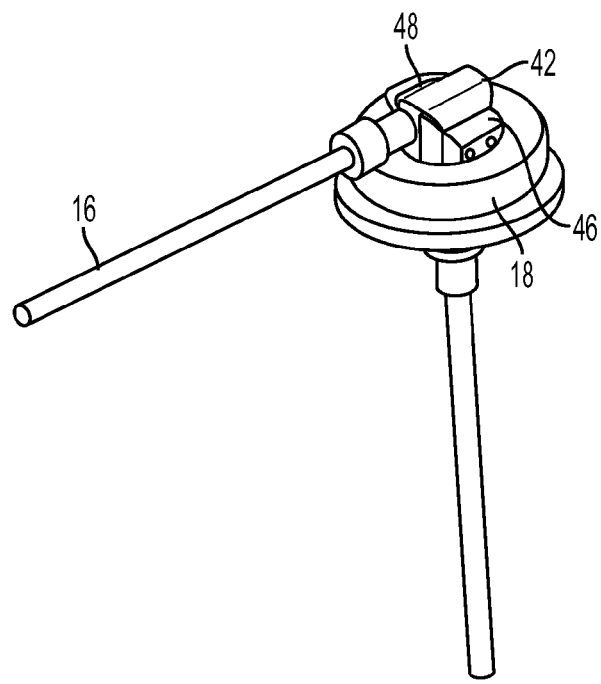
FIGS. 7A-7C are perspective, exploded, and cross-sectional views, respectively, of the hose coupler and container cap in accordance with an aspect of the present invention.
Figure 7B:
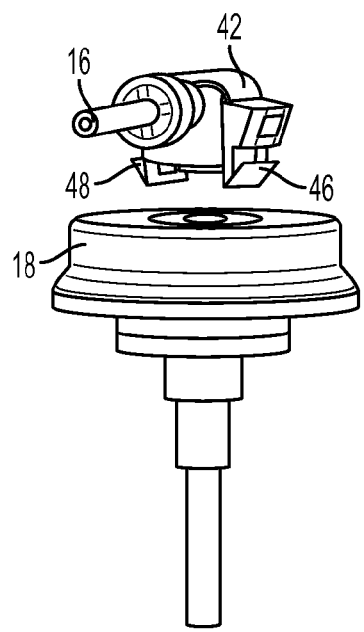
Figure 7C:
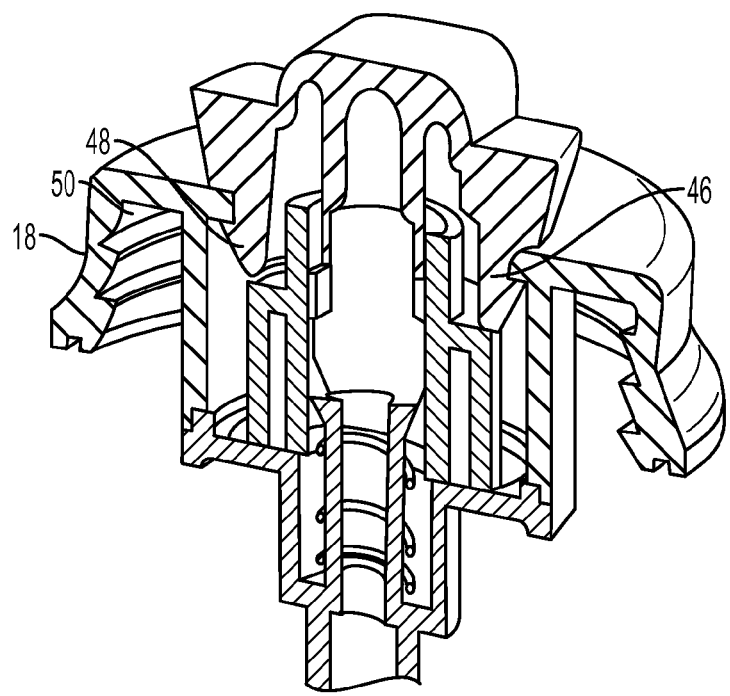
Figure 8A:
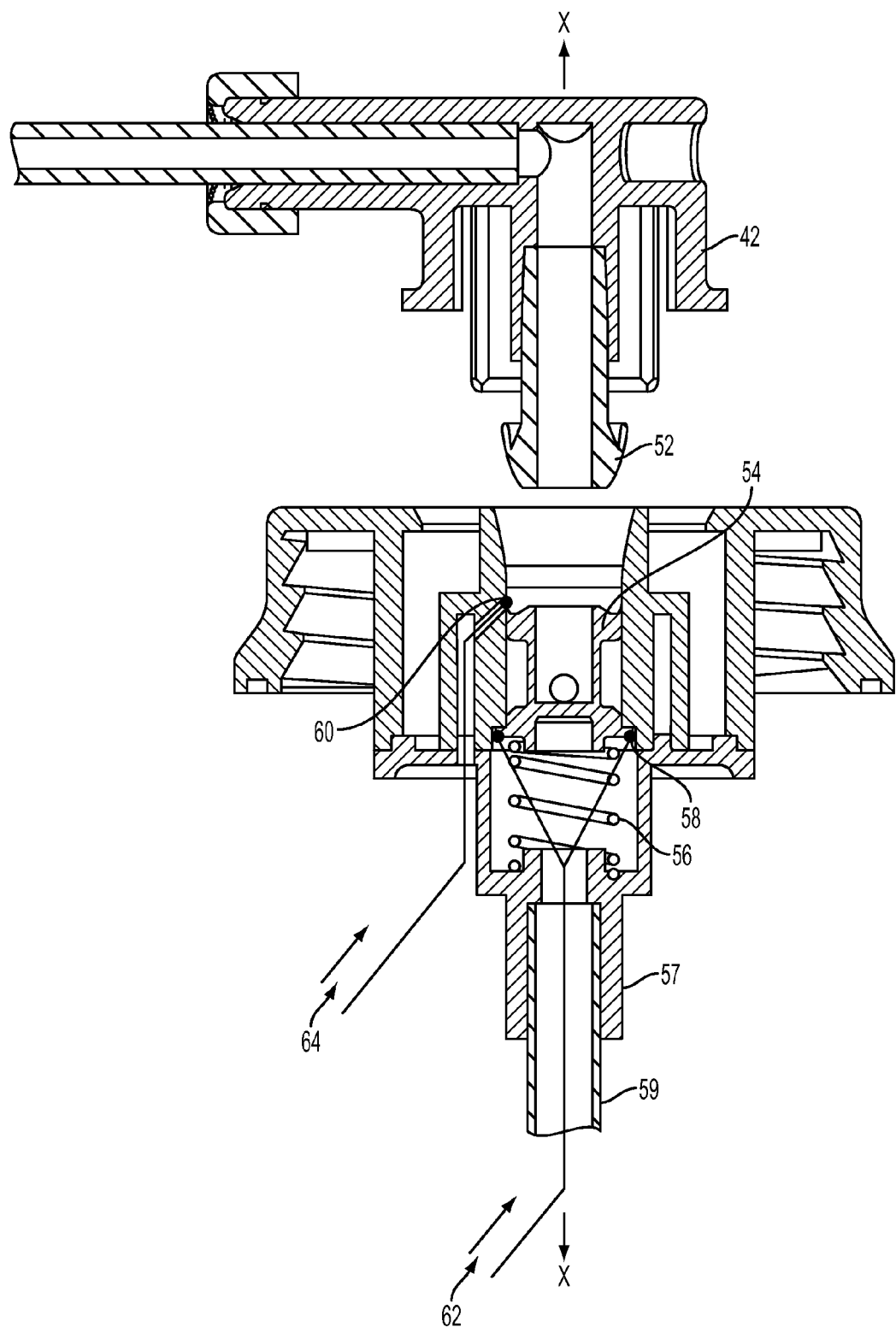
FIGS. 8A and 8B are cross-sectional views of a first configuration of the hose coupler and container cap in detached and attached relation to one another, respectively.
Figure 8B:
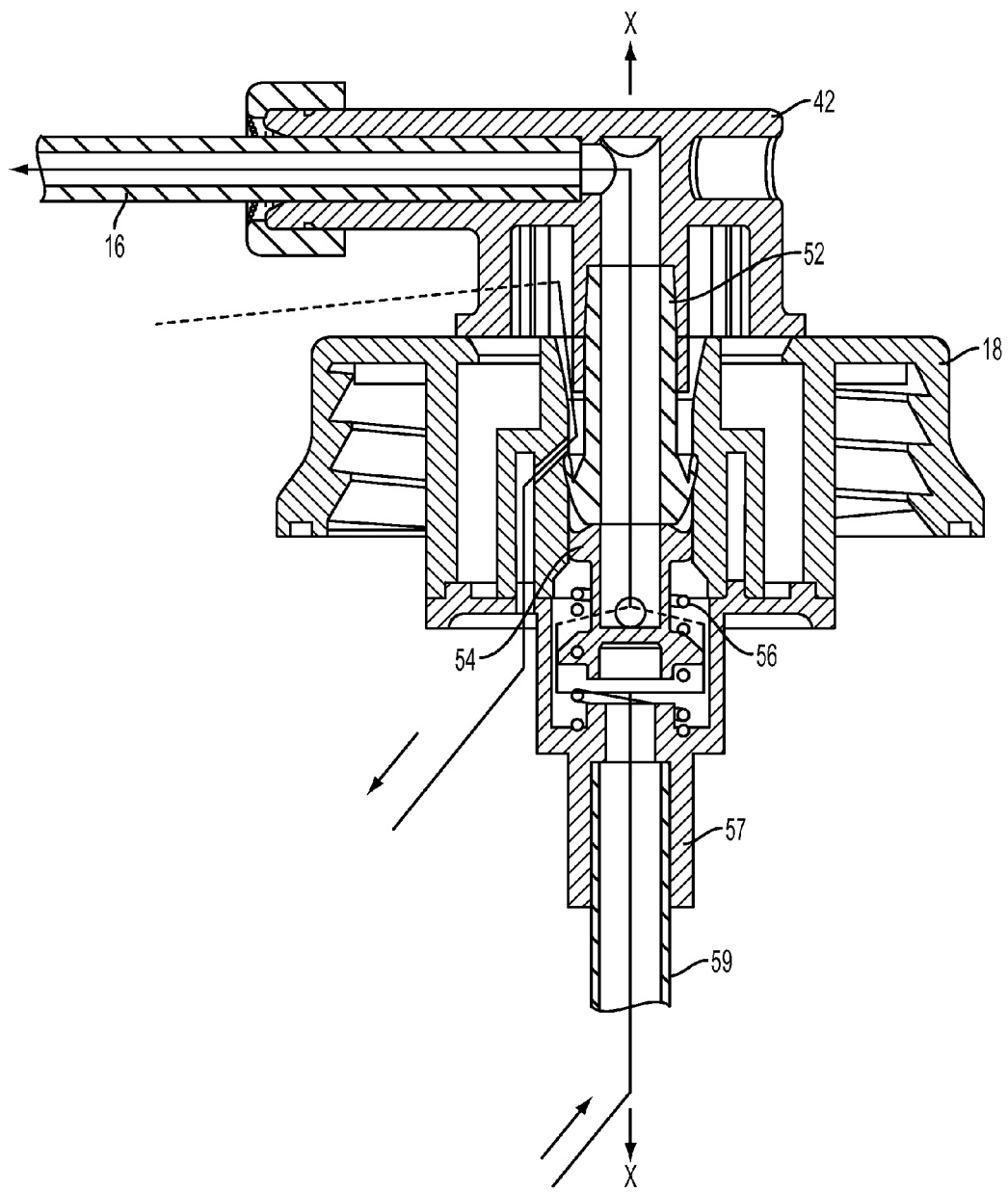

Referring to FIGS. 3-5, another feature associated with container 12 is a communication card assembly 28 that attaches to lug 24 and is positioned between container 12 and spray wand 14 when the sprayer system is shipped and displayed for sale. Communication card assembly 28 comprises a card retaining portion 30 to which a card 31 may be adhered or otherwise attached and an assembly attachment portion 32 and functions to communicate product information to the consumer; contain the wand 14 and coiled hose 16; and provides security to the packaging. Card assembly 28 may be released from container 12 by tearing along perforation lines 34 and then discarded or recycled by the customer during the connection of the hose 16 to the container 12. FIG. 4 simply represents a refill container 12 that can be supplied/sold without the wand assembly 14 which is facilitated due to the use of lug 24 and slot 26 that permits reuse of the wand assembly 14.

To retain wand 14 and coiled hose 16, card assembly 28 includes locking mechanism 36 that engages slot 26 and prevents detachment of the wand until the card assembly is detached from container 12 via perforation lines 34.

With reference to FIGS. 6A-6C and 7A-7C, container 12 includes a cap 18 that is shipped with a safety seal 40 adhered there over. Upon removal of safety seal 40 and detachment of wand 14 and hose 16 from the container 12, the coupler end 42 of hose 16 may be snappingly engaged with an exposed opening 44 on cap 18. Coupler 42 includes a pair of opposed, biased latches 46, 48 extending downwardly therefrom that snappingly and securely engage a flanged rim 50 formed on the underside of cap 18 to secure hose 16 to container 14, and create a fluid circuit between the fluid contents within container 12 and wand 14, as will be described hereinafter. Once connected, coupler 42 is capable of swiveling 360 degrees relative to cap 18.

With reference to FIGS. 8-11, there are four versions or configurations in which the hose 16 establishes a fluid circuit with the fluid contents of container 12. In the first version shown in FIGS. 8A and 8B, coupler 42 includes a separate stem 52 that extends downwardly from the coupler 42 and through cap 18. In this version both the necessary air and fluid sealing is controlled by a spring loaded plunger 54 that is positioned along the longitudinal axis X-X that extends centrally through the cap 18 and is separated from stem 52 by a spring 56 that is co-axially sandwiched between a dip tube holder 57 (that holds/retains dip tube 59) and plunger 54. In FIG. 8A which shows the coupler 42 disconnected from the cap 18, spring 56 biases plunger 54 upwardly which annularly seals the fluid circuit at point 58 and annularly seals the air passage at point 60. In FIG. 8B which shows coupler 42 connected to cap 18, stem 52 engages and compresses spring 56, thereby opening a fluid passageway as reflected by arrow 62 as well as an air passageway as reflected by arrow 64. The simultaneous opening of passageways 62 and 64 permits the flow of fluid out of container 12 (when the trigger on the wand is manually activated and compressed air is present within container 12 as understood in the art).

Figure 9A:
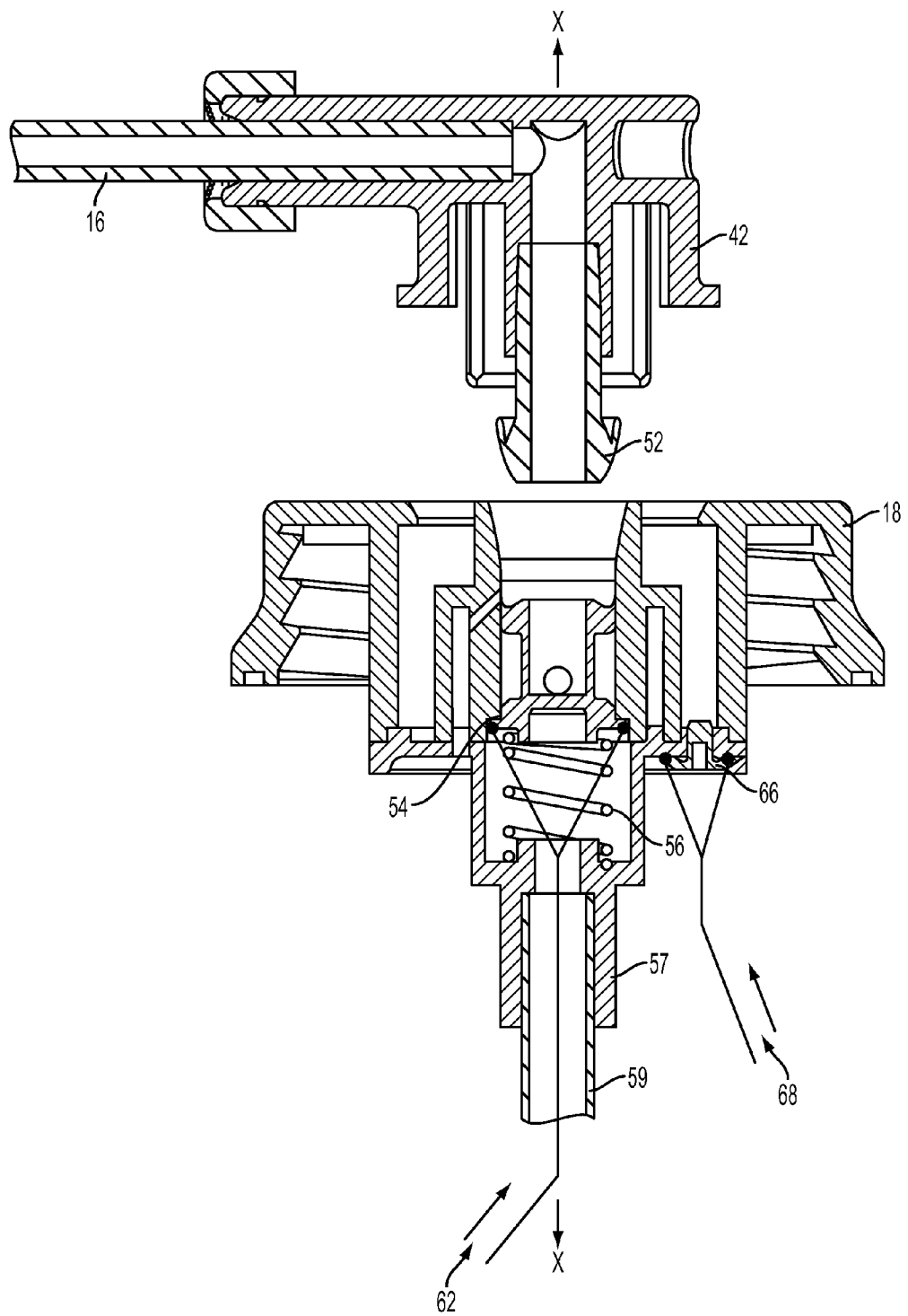
FIGS. 9A and 9B are cross-sectional views of a second configuration of the hose coupler and container cap in detached and attached relation to one another, respectively.
Figure 9B:
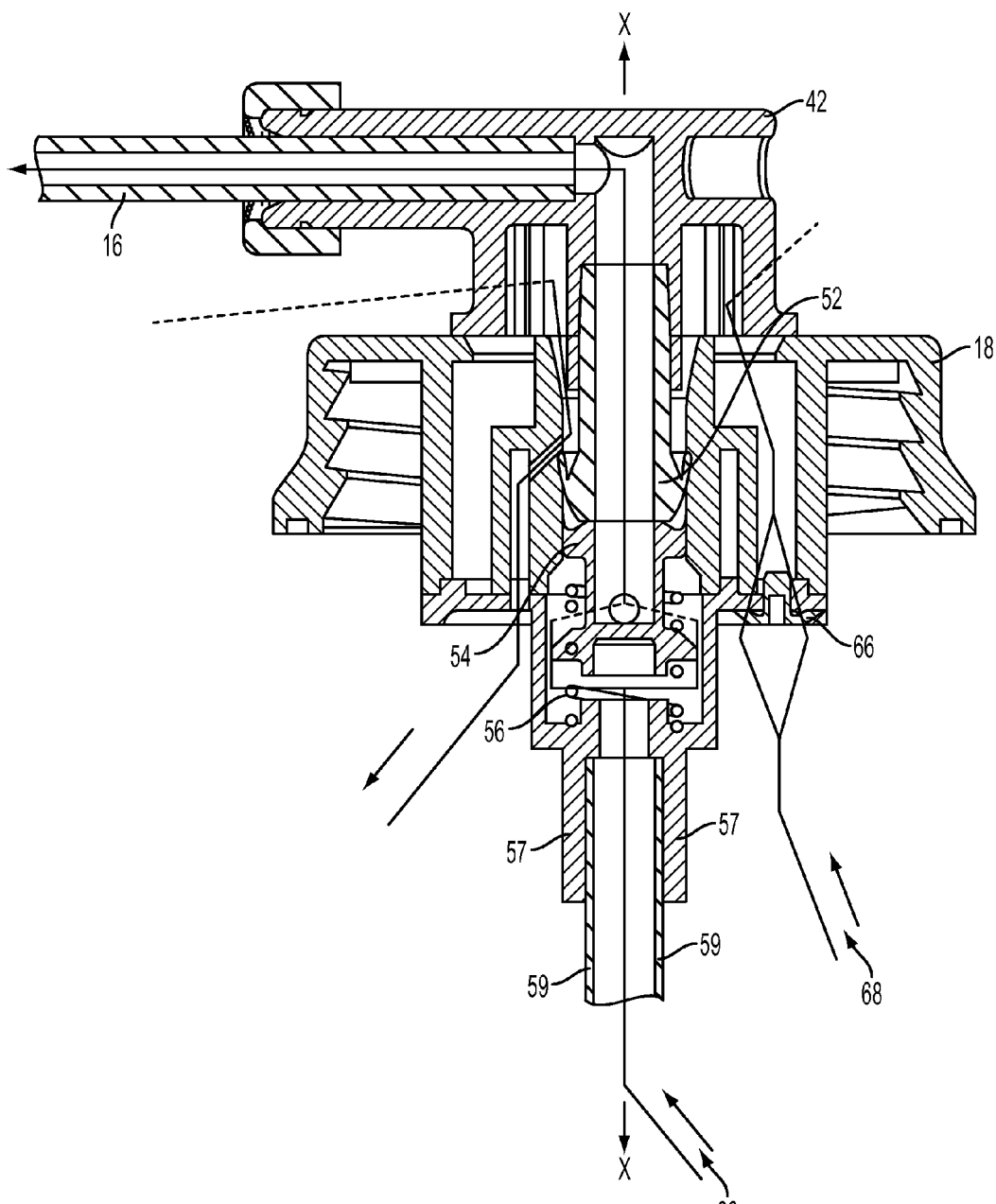

With reference to FIGS. 9A and 9B, a second version or configuration in which hose 16 establishes a fluid circuit with the fluid contents of container 12 is shown. In FIG. 9A, an umbrella valve 66 is positioned in sealed relation to an air passageway located at the bottom of cap 18. As shown in FIG. 9B, when the stem 52 engages and compresses spring 56 it displaces the plunger 54 which in turn causes the fluid passageway 62 (same as first configuration) to open and also causes umbrella valve 66 to pop and open air passageway 68. The simultaneous opening of passageways 62 and 68 permits the flow of fluid out of container 12 (when the trigger on the wand is manually activated and compressed air is present within container 12 as understood in the art).

Figure 10A:
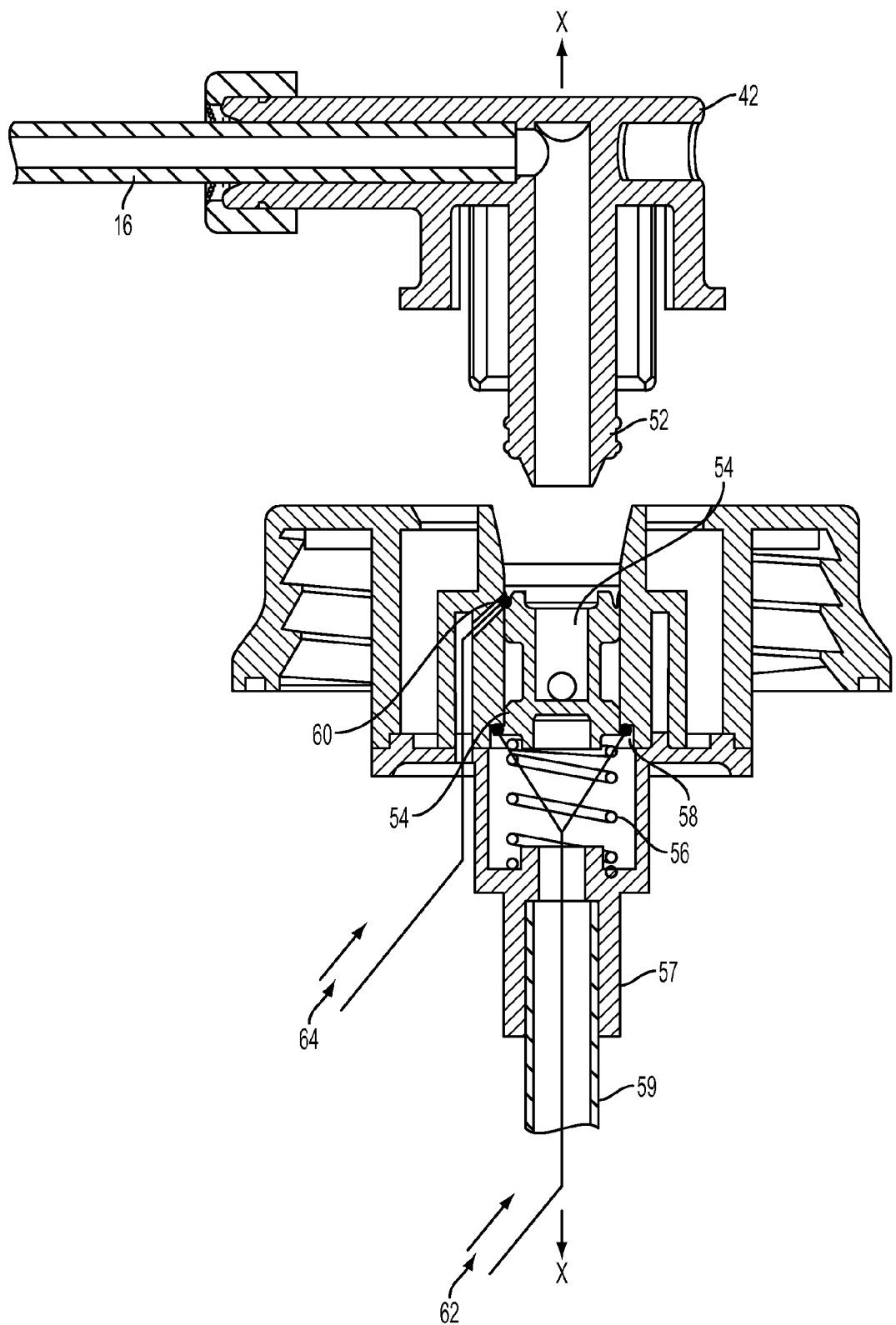
FIGS. 10A and 10B are cross-sectional views of a third configuration of the hose coupler and container cap in detached and attached relation to one another, respectively.
Figure 10B:
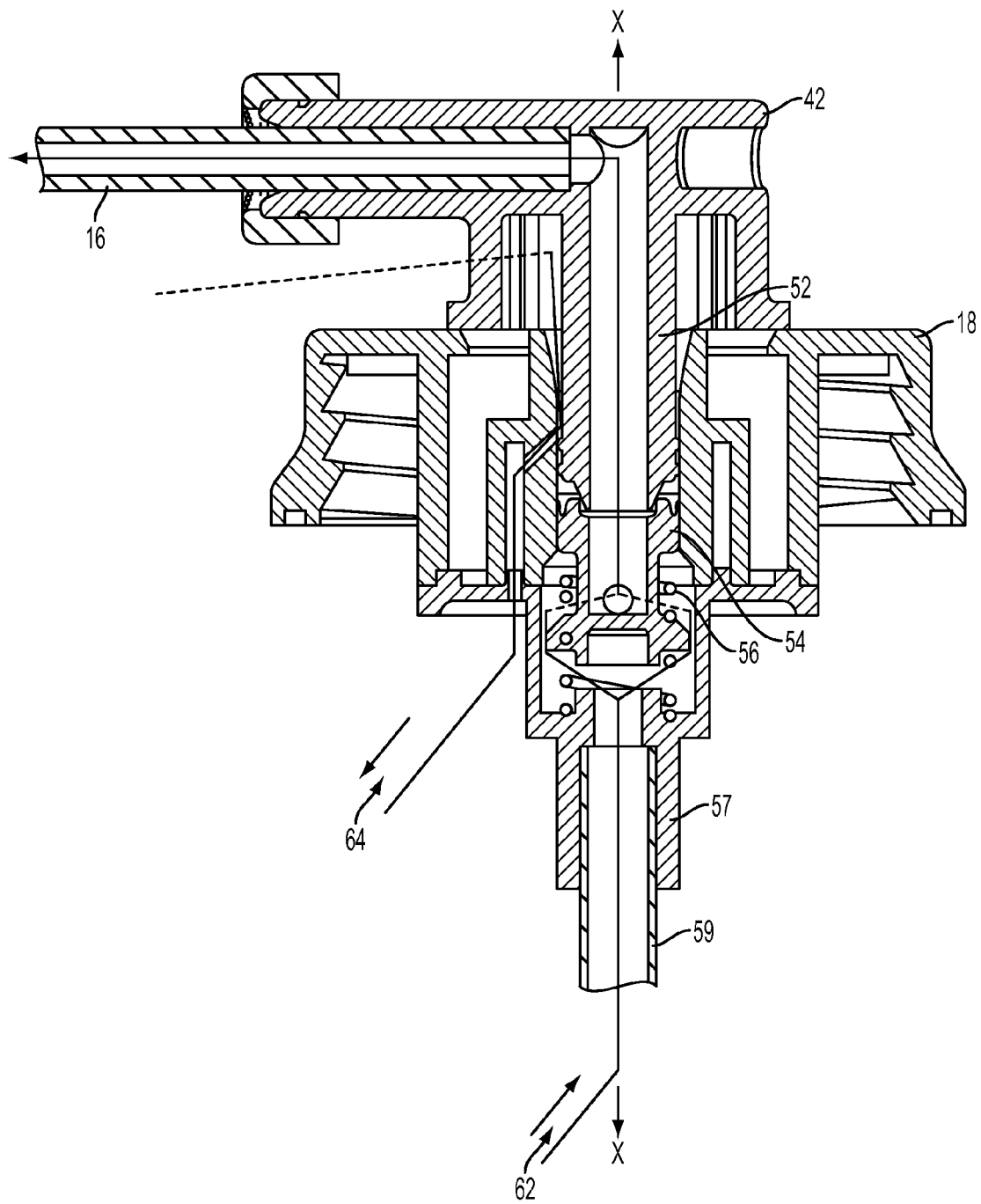

With reference to FIGS. 10A and 10B, a third version or configuration in which hose 16 establishes a fluid circuit with the fluid contents of container 12 is shown. In this configuration, everything is identical to the first version except that stem 52 is integral with coupler 42 instead of separate as it is with the first version. Otherwise, this third version and the first version are identical.

Figure 11A:
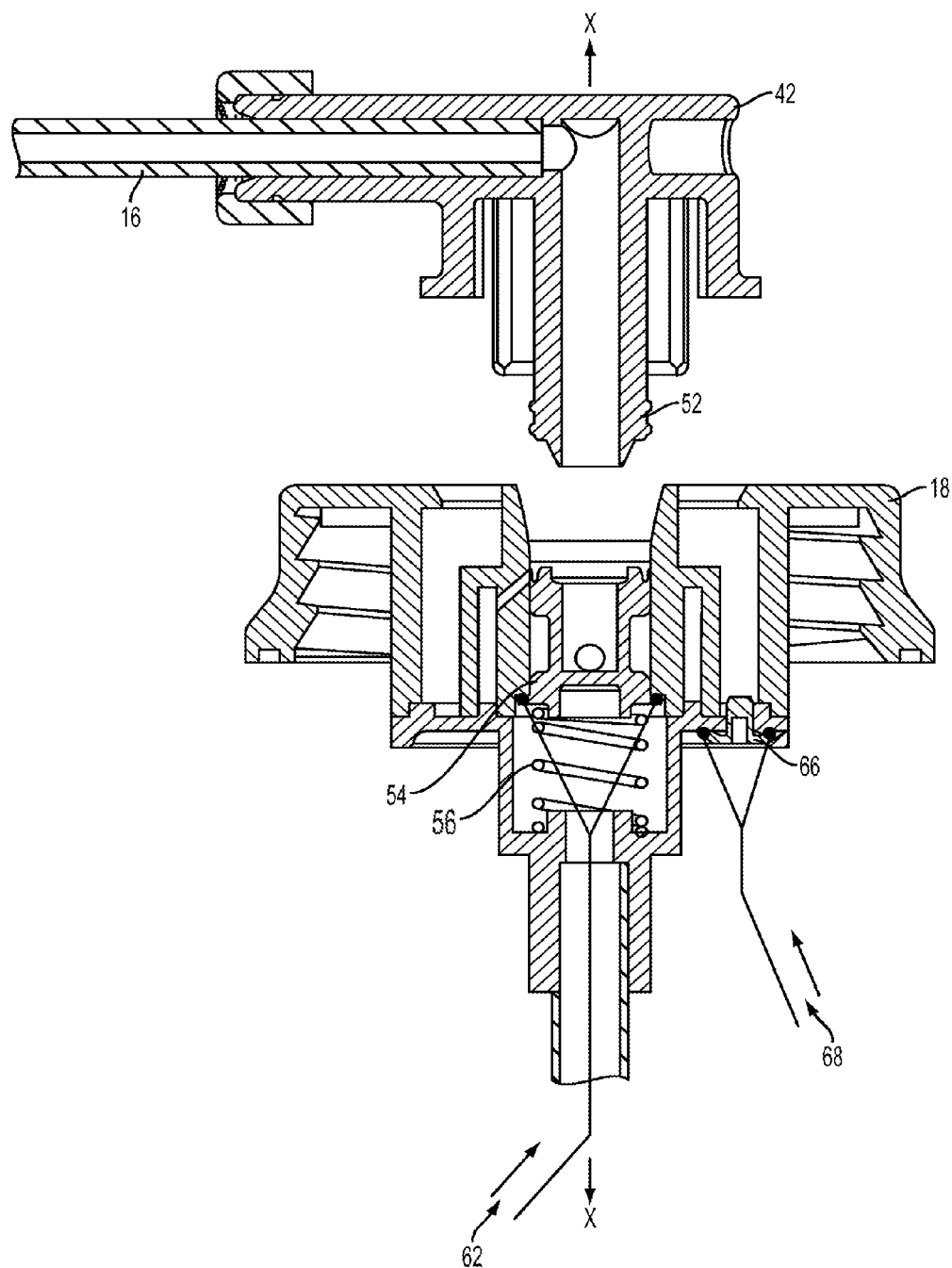
FIGS. 11A and 11B are cross-sectional views of a fourth configuration of the hose coupler and container cap in detached and attached relation to one another, respectively.
Figure 11B:
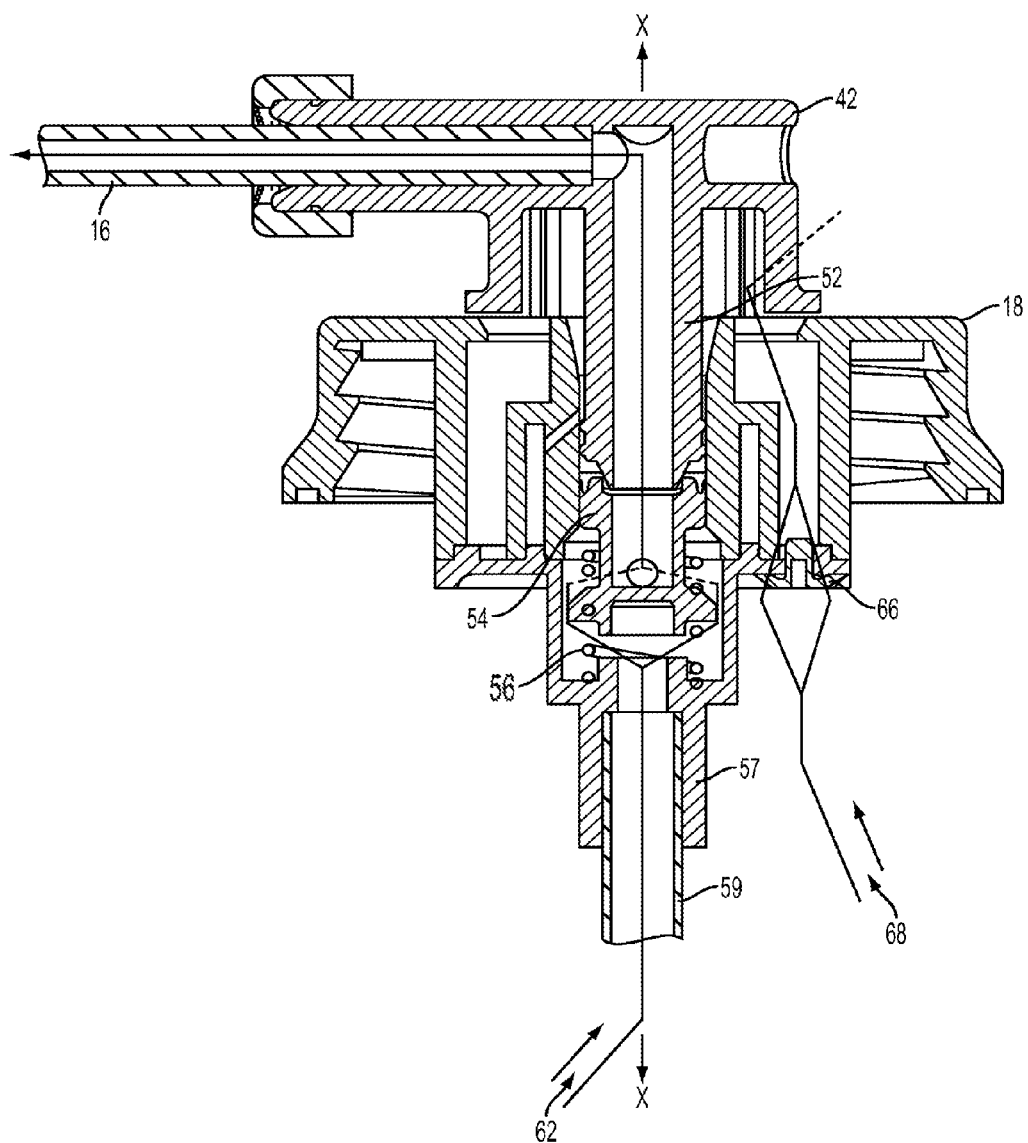

With reference to FIGS. 11A and 11B, a fourth version or configuration in which hose 16 establishes a fluid circuit with the fluid contents of container 38 is shown. In this configuration everything is identical to the second version except that stem 52 is integral with coupler 42 instead of separate as it is with the second version. Otherwise, this fourth version and the second version are identical.

Figure 12A:
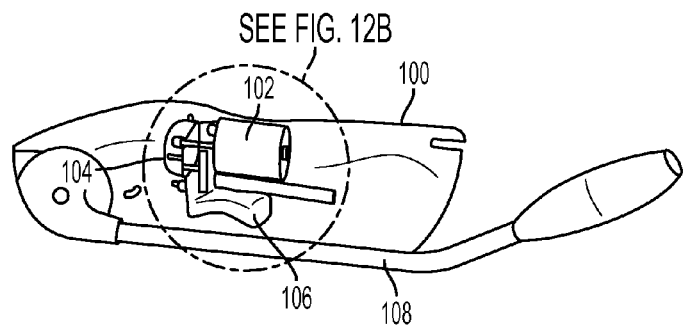
FIGS. 12A and 12B are cut-away and exploded perspective views, respectively, of a motor housing, motor and valve body in accordance with an aspect of the present invention.
Figure 12B:
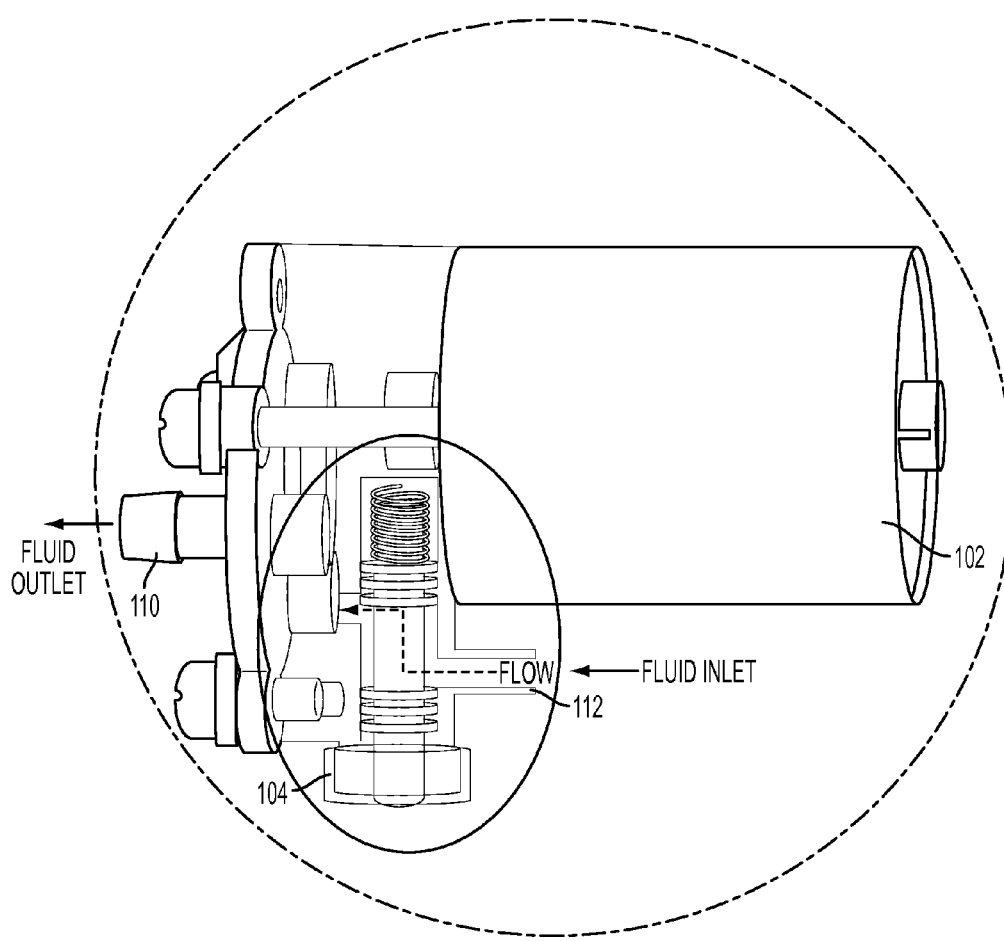

With reference to FIGS. 12A and 12B, an aspect of the present invention is shown that includes integration of a valve body into a pump motor housing. In this aspect of the invention, a wand handle 100 includes a hollow interior volume in which a motor 102 is stowed. Integrated with motor 102 is a valve body 104 that is operational between open and closed positions by means of a trigger 106 mounted on the underside of the handle 100. The wand 108 is pivotally mounted to handle 100 and in fluid communication with a fluid outlet 110 that extends from valve body 104. A fluid inlet 112 is placed in fluid communication with the fluid contents of container 12 by means of a dip tube, such as dip tube 59 shown in other Figures. Upon manual movement of trigger 106, the fluid passageway between inlet 112 and outlet 110 is opened and upon release of the trigger the passageway is closed, thereby fluidly sealing container 12. The use of a motor to drive a pump and provide the pumping necessary to compress and expel fluid from a container is otherwise well understood in the art.

What is claimed is:

1. A sprayer assembly, comprising:
   a. a container;
   b. a spray wand;
   c. a hose fluidly interconnecting said spray wand to said container;
   d. a fluid circuit, comprising:
      i. a coupler attached to said hose and adapted for attachment to said container;
      ii. a stem extending from said coupler along a longitudinal axis;
      iii. air and fluid passageways extending from within said container through said coupler;
      iv. a plunger extending along said longitudinal axis and movable between sealed and unsealed relation to said air and fluid passageways;
      v. a spring extending along said longitudinal axis and positioned in biased relation to said plunger, wherein said spring is compressed when said coupler is attached to said container and biases said plunger out of sealing relationship with said air and fluid passageways;
   e. a cap coupled to said container; and
   f. wherein said coupler is adapted for attachment to said cap and comprises first and second biased latches, and said cap comprises a flanged rim formed on its underside, said first and second latches adapted for securely engaging said flanged rim to interconnect said coupler to said container.

2. The sprayer assembly according to claim 1, wherein said coupler is rotatable about said longitudinal axis when connected to said cap.

3. The sprayer assembly according to claim 1, wherein said stem is integral with said coupler.

4. The sprayer assembly according to claim 1, wherein said stem is separate from said coupler.

5. A sprayer assembly, comprising:
   g. a container;
   h. a spray wand;
   i. a hose fluidly interconnecting said spray wand to said container;
   j. a fluid circuit, comprising:
      i. a coupler attached to said hose and adapted for attachment to said container;
      ii. a stem extending from said coupler along a longitudinal axis;
      iii. an air passageway extending from within said container through said coupler;
      iv. a fluid passageway extending from within said container through said coupler;
      v. a plunger extending along said longitudinal axis and movable between sealed and unsealed relation to one of the air or fluid passageways;
      vi. a dip tube holder extending along said longitudinal axis;
      vii. a valve mounted within said container and movable between sealed and unsealed relation to the air or fluid passageway to which said plunger is not relatively movable;
      viii. a spring extending along said longitudinal axis and positioned between said dip tube holder and said plunger, whereby said spring is compressed when said coupler is attached to said container and biases said plunger out of sealing relationship with the air or fluid passageway and biases said dip tube holder which in turn moves said valve out of sealing relationship with the air or fluid passageways;
   k. a cap coupled to said container;
   l, wherein said coupler is adapted for attachment to said cap and comprises first and second biased latches, and said cap comprises a flanged rim formed on its underside, said first and second latches adapted for securely engaging said flanged rim to interconnect said coupler to said container.

6. The sprayer assembly according to claim 5, wherein said coupler is rotatable about said longitudinal axis when connected to said cap.

7. The sprayer assembly according to claim 5, wherein said stem is integral with said coupler.

8. The sprayer assembly according to claim 5, wherein said stem is separate from said coupler.

9. A sprayer assembly, comprising:
   a. a container;
   b. a spray wand comprising a handle portion and a wand portion, said handle portion comprising a slot formed therein;
   c. a hose fluidly interconnecting said spray wand to said container;
   d. a lug formed on said container, the lug configured to engage the slot of said spray wand in order to mount said spray wand to said container; and
   e. a communication card assembly comprising a card retaining surface and an assembly portion configured to engage said lug, a locking mechanism configured to engage said slot and prevent detachment of said spray wand until said communication card assembly has been detached from said container, said communication card assembly being positioned between said container and said spray wand.

10. The sprayer assembly according to claim 9, wherein said communication card assembly further comprises a perforation line configured to permit it to be torn and removed from said container.

\* \* \* \* \*